No. 737,735. PATENTED SEPT. 1, 1903.
H. J. HALLE.
CARD OR SHEET HOLDER FOR TYPE WRITING MACHINES.
APPLICATION FILED JUNE 30, 1900.
NO MODEL. 8 SHEETS—SHEET 1.
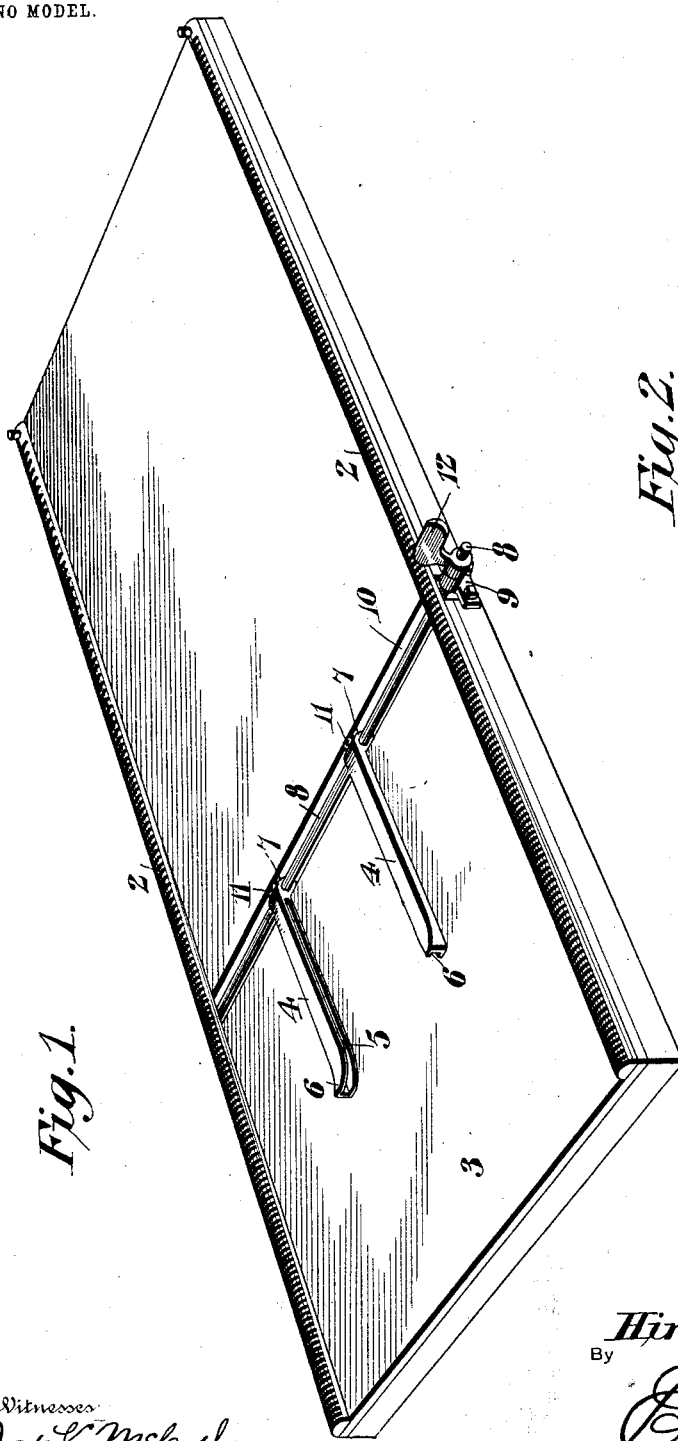
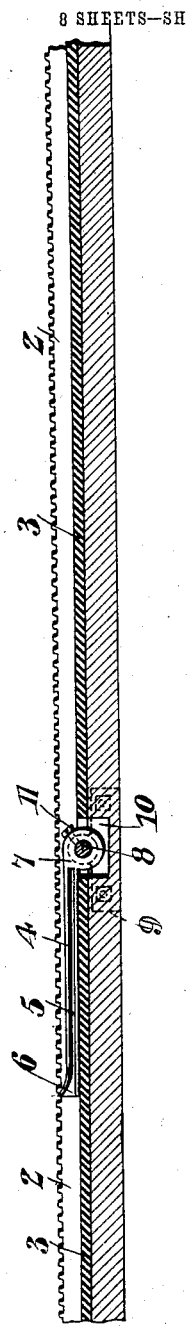
Witnesses
Jas. F. McCathran
D. T. Holthaupter
Hiram J. Halle, Inventor
By E. G. Siggers
Attorney No. 737,735. PATENTED SEPT. 1, 1903.
H. J. HALLE.
CARD OR SHEET HOLDER FOR TYPE WRITING MACHINES.
APPLICATION FILED JUNE 30, 1900.
NO MODEL. 8 SHEETS—SHEET 2.
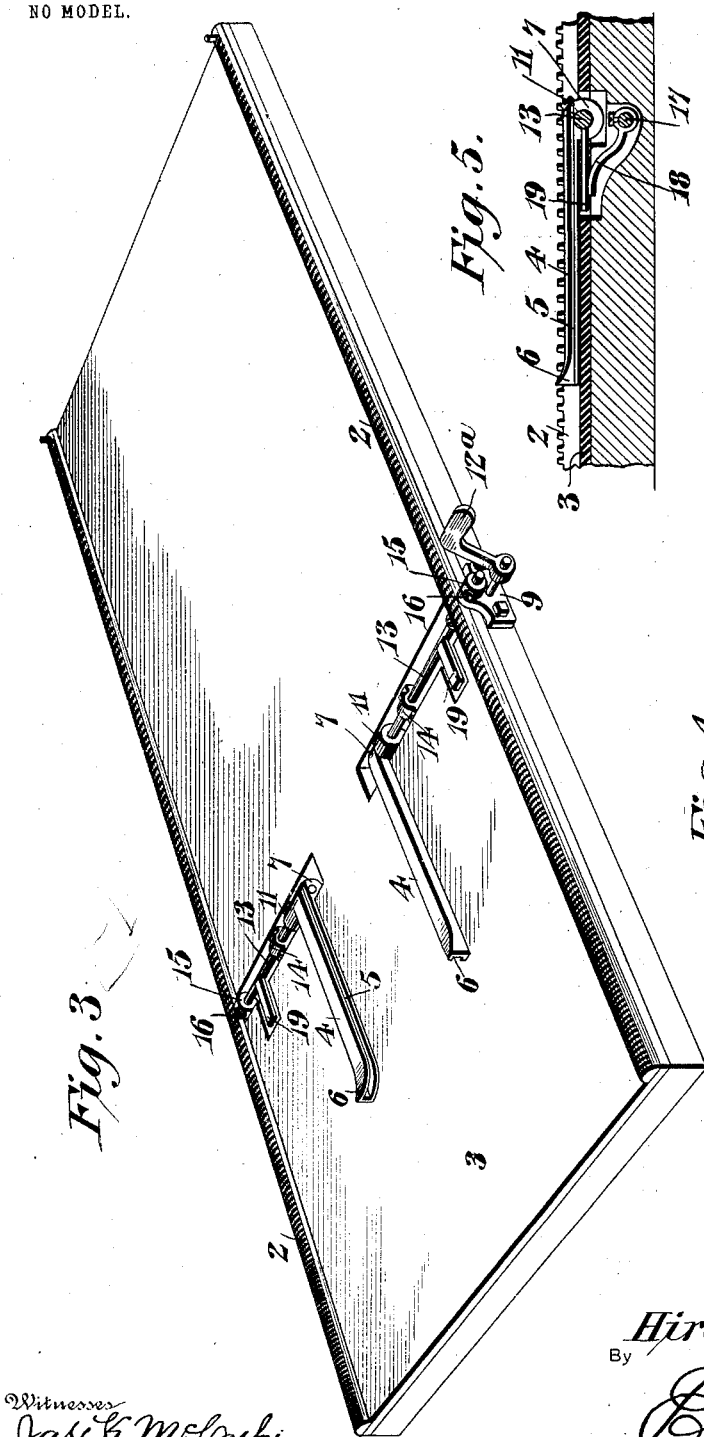
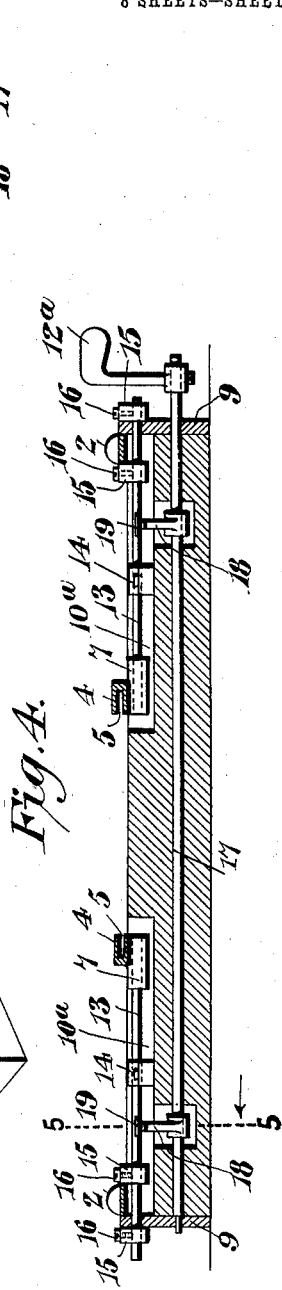

No. 737,735. PATENTED SEPT. 1, 1903.
H. J. HALLE.
CARD OR SHEET HOLDER FOR TYPE WRITING MACHINES.
APPLICATION FILED JUNE 30, 1900.
NO MODEL. 8 SHEETS—SHEET 3.
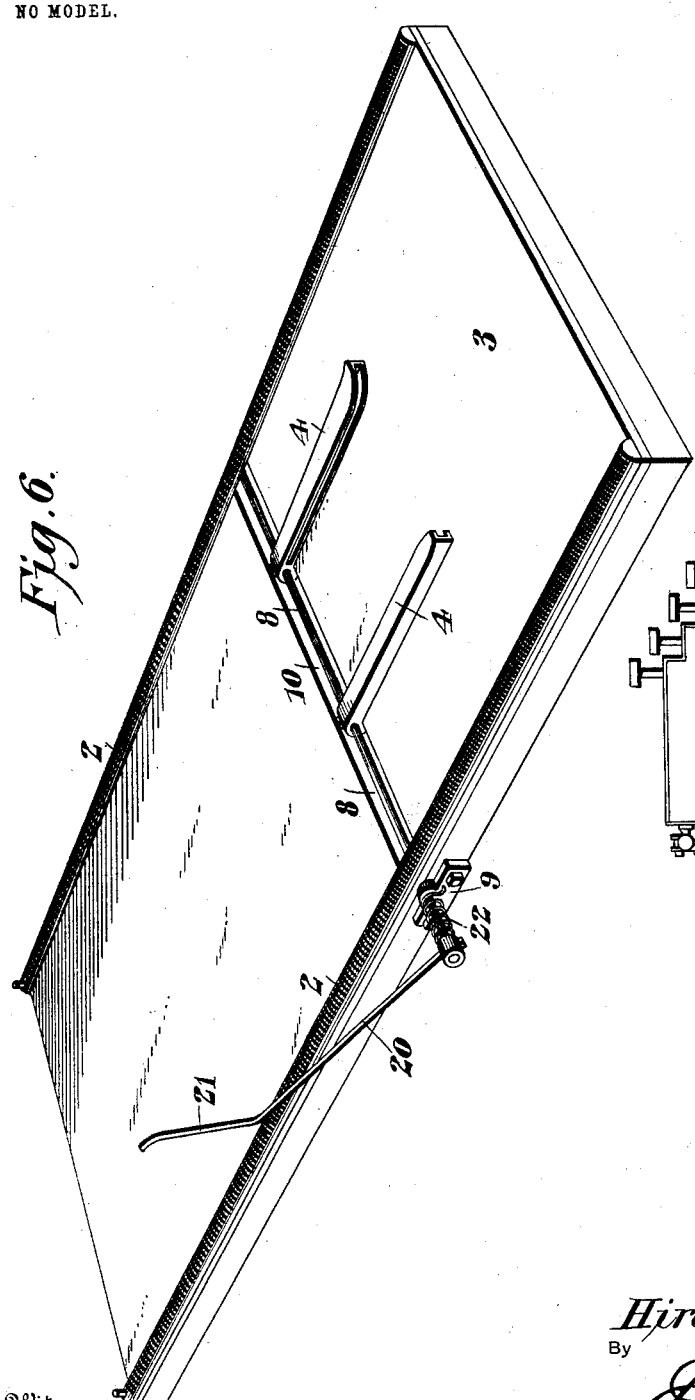
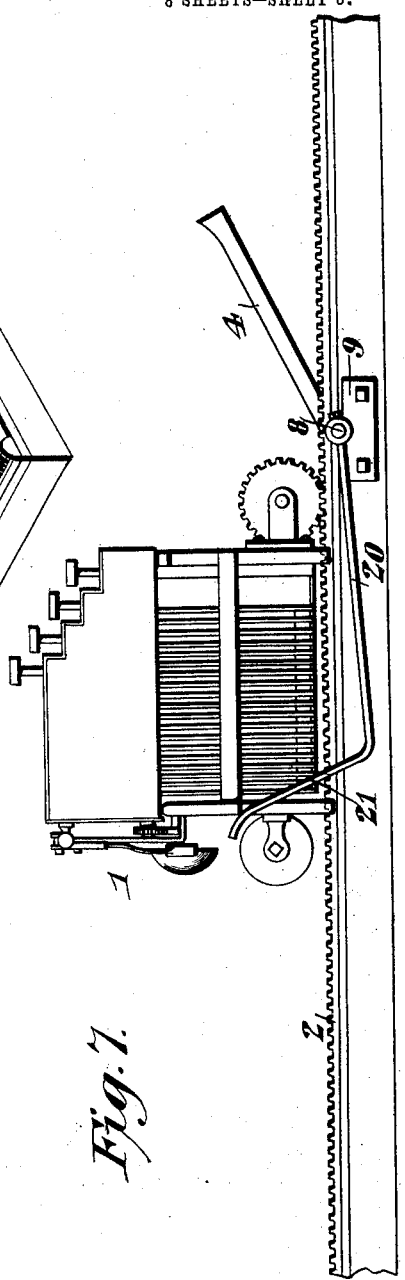
Hiram J. Halle,
By E. G. Siggers
Inventor
Attorney
Witnesses
Jas. K. McCathran

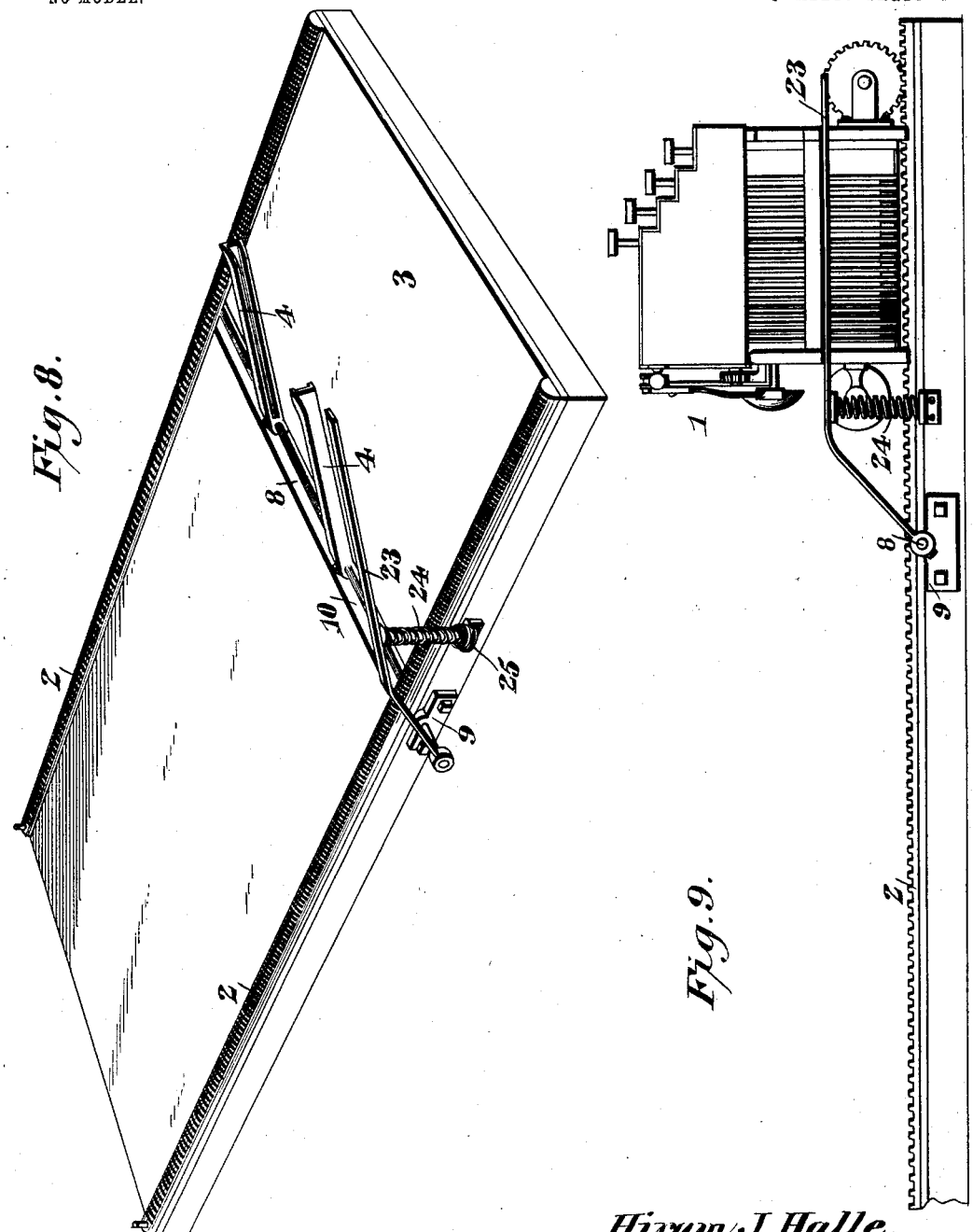

No. 737,735. PATENTED SEPT. 1, 1903.
H. J. HALLE.
CARD OR SHEET HOLDER FOR TYPE WRITING MACHINES.
APPLICATION FILED JUNE 30, 1900.
NO MODEL. 8 SHEETS—SHEET 5.
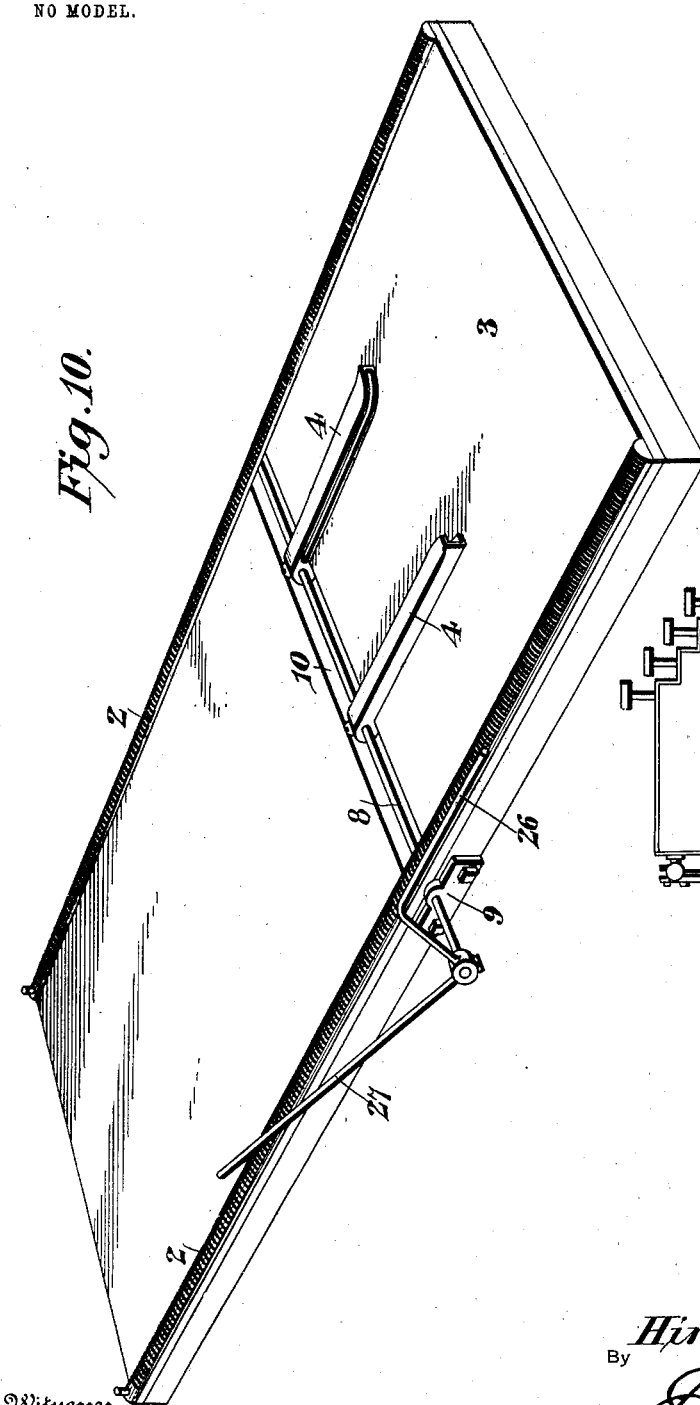
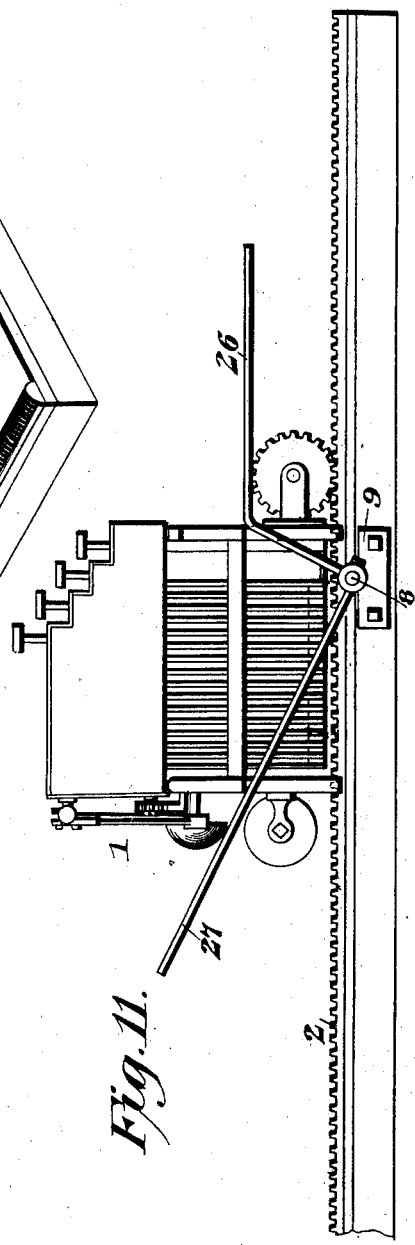
Hiram J. Halle,
Inventor

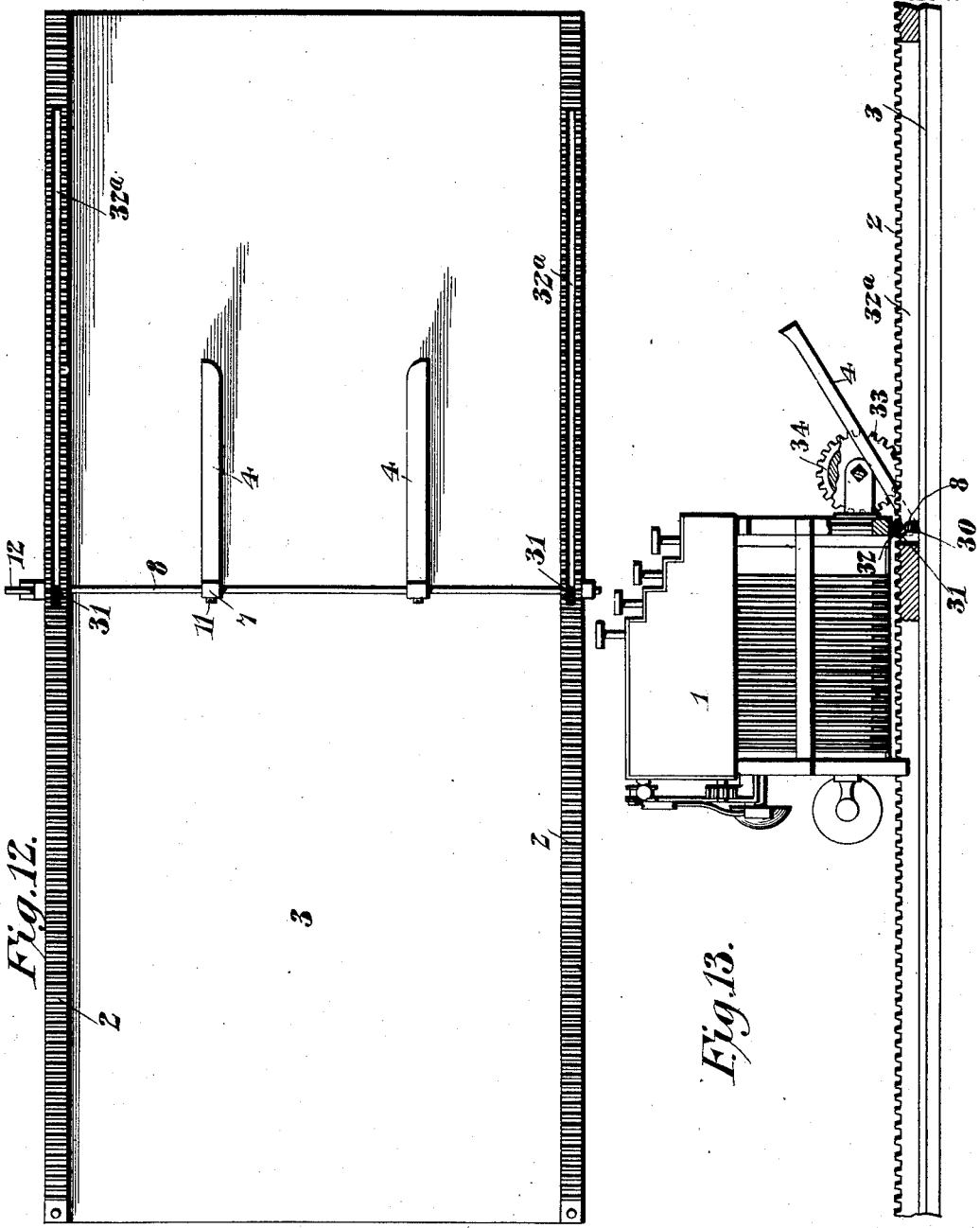

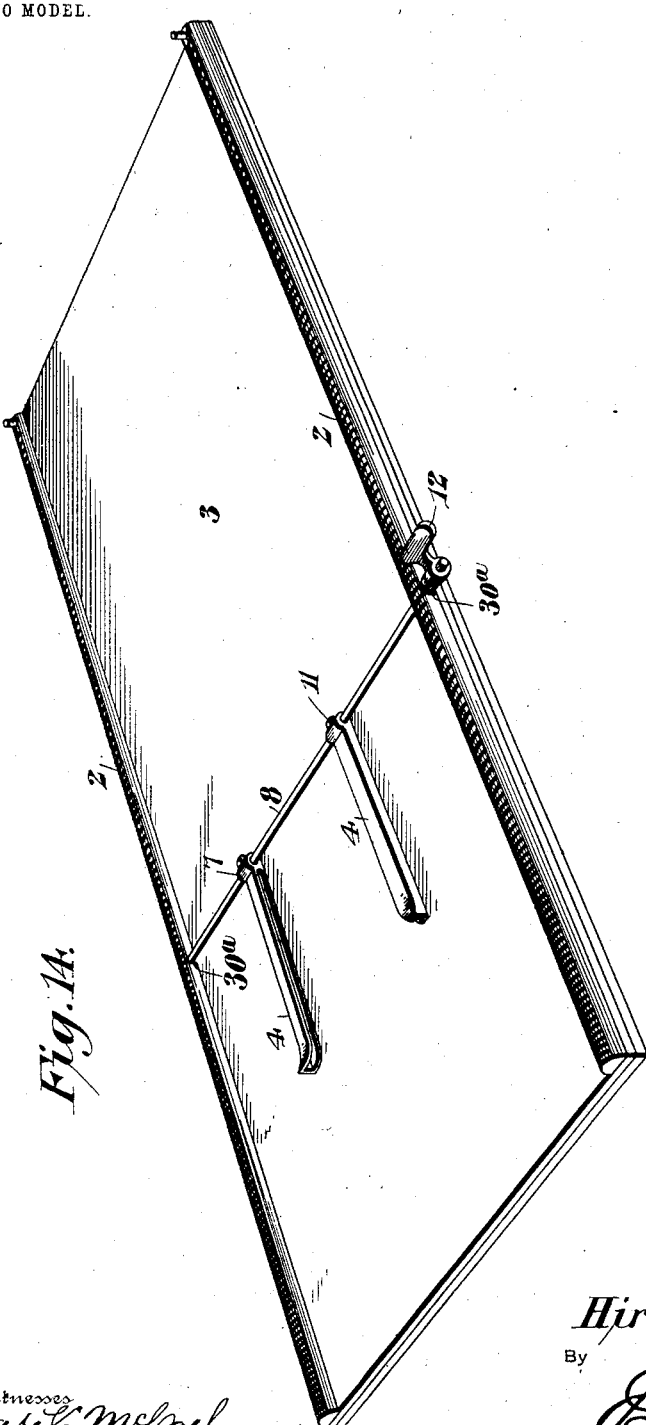

No. 737,735. PATENTED SEPT. 1, 1903.
H. J. HALLE.
CARD OR SHEET HOLDER FOR TYPE WRITING MACHINES.
APPLICATION FILED JUNE 30, 1900.
NO MODEL. 8 SHEETS—SHEET 8.
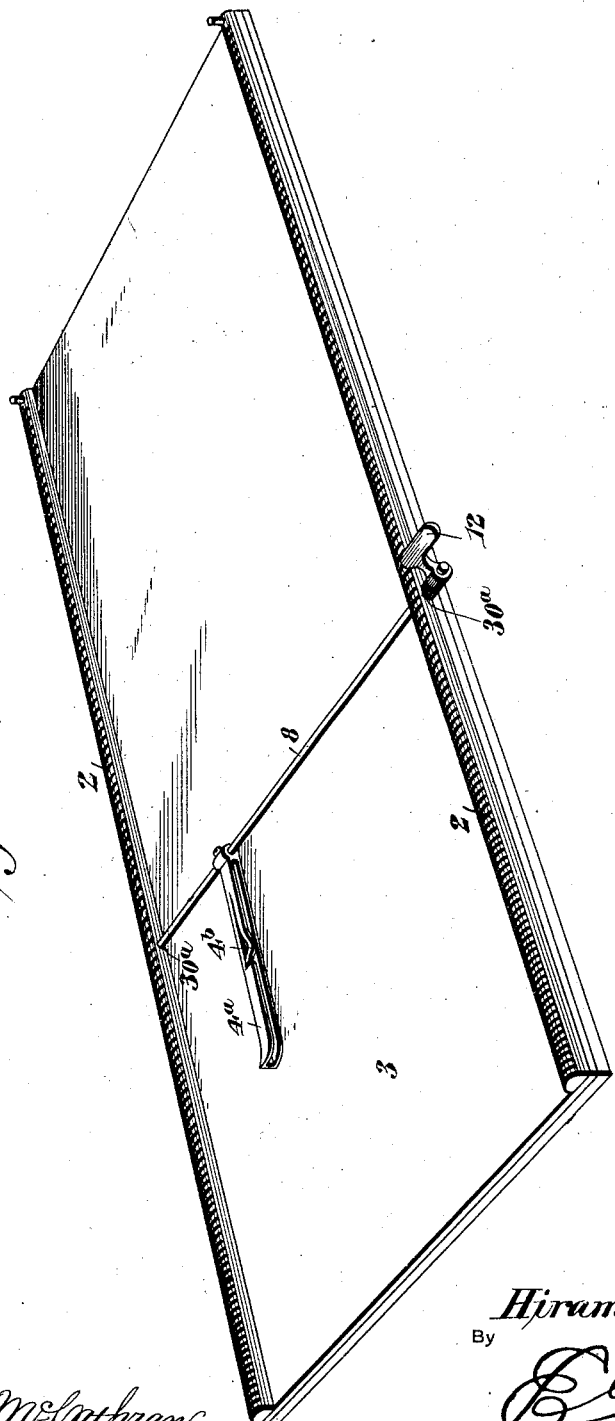

No. 737,735. Patented September 1, 1903.

UNITED STATES PATENT OFFICE.

HIRAM JOSEPH HALLE, OF CLEVELAND, OHIO, ASSIGNOR, BY MESNE ASSIGNMENTS, TO ELLIOTT-FISHER COMPANY, A CORPORATION OF DELAWARE.

CARD OR SHEET HOLDER FOR TYPE-WRITING MACHINES.

SPECIFICATION forming part of Letters Patent No. 737,735, dated September 1, 1903.

Application filed June 30, 1900. Serial No. 22,206. (No model.)

*To all whom it may concern:*

Be it known that I, HIRAM JOSEPH HALLE, a citizen of the United States, residing at Cleveland, in the county of Cuyahoga and State of Ohio, have invented a new and useful Card or Sheet Holder for Type-Writing Machines, of which the following is a specification.

This invention relates to that class of typewriting machines which print upon the work in a spread-out or flat condition and which are associated with a flat platen, upon which the sheet or work is supported during the printing operation.

To this end the invention has special reference to a work-holder adapted to be interposed in a plane between the printing mechanism and the writing-surface of the platen and having guiding and holding means for the edges of a card or sheet, whereby efficient and thoroughly practical means are provided for holding a card or sheet in a perfectly flat condition and in such relation to the machine and its platen as to permit of the writing being placed upon any portion of the card or sheet within the side and end margins thereof.

A further object of the invention is to effect certain improvements in the mounting of the work-holder with relation to the platen and the printing mechanism to facilitate the handling of a card or sheet.

While largely intended to facilitate printing any desired data upon index-cards, such as are used in the well-known card system of indexing, the invention may be said to have as its general object the provision of means for holding the card or sheet in a perfectly flat condition, permitting the card or sheet to be written upon at any point within the edges thereof, insuring a maximum speed in writing upon the cards or sheets, and also providing suitable adjustment for the different elements, whereby the work-holder as an entirety may be adapted for different sizes or shapes of cards or sheets.

In carrying out the aforesaid and other objects the improvements are intended to present another aspect of the invention disclosed in my companion application, filed October 7, 1899, Serial No. 732,921.

The essential features of the improvements forming the subject-matter of the present application are susceptible to a wide range of modification without departing from the spirit or scope of the invention; but the preferred embodiments of the improvements are shown in the accompanying drawings, in which—

Figure 1 is a perspective view of a typewriting-machine platen equipped with a work-holder embodying one form of the invention in which the elevation of the work-holder is accomplished manually and the lowering thereof by gravity. Fig. 2 is a longitudinal sectional view of the construction shown in Fig. 1. Fig. 3 is a perspective view, similar to Fig. 2, showing a modification in which the separate members of the work-holder are mounted, respectively, upon separate shaft-sections and the movement thereof to and from the writing-surface is accomplished by the same means as utilized in the aforesaid construction shown in Fig. 1. Fig. 4 is a transverse sectional view of the construction shown in Fig. 3, illustrating the relative arrangement of the several shaft elements. Fig. 5 is an enlarged detail sectional view on the line 5 5 of Fig. 4. Fig. 6 is a perspective view of another modification, showing an embodiment in which the raising or elevating of the work-holder is accomplished automatically by the backward movement of the machine as it is pushed back upon the platen away from the printing area contiguous to the work-holder. Fig. 7 is a side view of the construction shown in Fig. 6, illustrating one means of providing for the automatic raising of the work-holder upon the backward movement of the machine or printing mechanism. Fig. 8 is a perspective view of another embodiment of the invention in which the work-holder is normally automatically elevated or raised from the writing-surface of the platen and is depressed to an operative position upon the writing-surface by the machine when arranged thereover. Fig. 9 is a side elevation of the construction shown in Fig. 8, illustrating the position of the printing mechanism or traveling machine when arranged over the work-holder. Fig. 10 is a perspective view showing another embodiment of the invention in which the movement of the printing mechanism or traveling machine is utilized to effect positively both the raising and the lowering of the work-holder. Fig. 11 is a side elevation of the construction shown in Fig. 10. Fig. 12 is a plan view showing one of the original conceptions of the invention involving the slotting of the main-track rails in connection with tappet-pins upon the rock-shaft carrying the work-holding member or members to provide means for raising the work-holder by the movement of the machine or printing mechanism. Fig. 13 is a side elevation, partly in section, of the construction shown in Fig. 12, illustrating the relation of the traveling printing mechanism to the work-holder when the printing mechanism is moved back upon the platen. Fig. 14 is a perspective view showing another embodiment of the original conception of the invention involving the arrangement of the supporting rock-shaft transversely across the top of the platen to constitute a removable attachment or fixture and obviating cutting out or grooving of the platen, as shown in some of the other forms of the invention. Fig. 15 is a longitudinal sectional view of the construction shown in Fig. 14. Fig. 16 is a perspective view of another form of the invention, illustrating the employment of a single holding-guide for a card or sheet in place of the pair of such guides constituting the work-holder in most forms of the invention.

Like numerals of reference designate corresponding parts in the several figures of the drawings.

The subject-matter of the present application relates particularly to a work-holder, which term is used synonymously with the term "card or sheet holder," inasmuch as it refers to the same type of card or sheet holder as disclosed in my aforesaid application, Serial No. 732,921, which application embraces claims generic to the idea of interposing a work-holder in a plane between the printing mechanism and the writing-surface of the platen and providing said work-holder with guiding and holding means for the edges of a card or sheet. The invention herein set forth, therefore, embodies another species of the invention, but involves several important advantages by reason of providing a novel mounting of the work-holder, whereby the same is movable in a direction to and from the writing-surface of the platen.

As set forth in my other application aforesaid, the improvements embodied in the construction and mounting of the work-holder are not necessarily confined to any particular kind of type-writing machine, as the same could obviously be utilized in connection with any form of type-writer coöperating with a flat platen for holding the work in a flat or spread-out condition. However, in order to give a comprehensive understanding of the invention the same is shown in the drawings for illustrative purposes as associated with a Fisher type-writing machine and its platen, such as are now on the market, a type of such machine being exemplified by the patent to R. J. Fisher, No. 573,868. The improvements are also shown associated with the form of platen which is known in the art as a "billing-platen;" but it is to be understood that the kind of platen and the particular type of printing mechanism form no part of the present invention and are simply shown in the drawings to illustrate the application of the invention thereto. The only parts of the aforesaid type-writing machine to which reference need be made are the traveling machine or printing mechanism proper, (designated by the numeral 1,) the main-track rails 2, upon which the traveling machine or printing mechanism rides, and the flat platen 3, upon which are placed the main-track rails 2 in the usual manner.

In carrying out the present invention there is one essential idea preserved in every form thereof—to wit, the interposition of the holder in a plane between the printing mechanism and the writing-surface of the platen and the provision of said holder with guiding and holding means for the edges of a card or sheet. Another feature common to all forms of the invention is the arrangement of the work-holder, whether consisting of one or a plurality of work-holding members, in a plane between the main tracks or guides for the type-carriage or printing mechanism, and in the forms involving the employment of the pair of work-holding members a common feature is to dispose said members in opposite relation to confine therebetween a printing space or area for the card or sheet. In addition to these common features the invention forming the subject-matter of the present application involves in all forms thereof a suitably-constructed work-holder adapted to not only occupy a position beneath the printing mechanism, but also movable in a direction to and from the writing-surface of the platen to facilitate the handling of the work, whether this work be a card, envelop, plain sheet, or plain sheets and carbon, as the conditions of the work may require. These necessary features of the invention may be embodied in a variety of constructions without affecting the principle of operation underlying the invention. So it will therefore be understood that the precise form of work-holder as well as the specific manner of mounting and operating the same are not important to the successful carrying out of the invention, as divers modifications of the construction and mounting of the work-holder may be resorted to.

Inasmuch as the work-holder may be constructed in different ways, so long as the same is interposed between the printing mechanism and the writing-surface of the platen and is provided with guiding and holding means for a card or sheet, the invention may be carried out by the employment of a single holding-guide 4ᵃ in place of one or more pairs of such guides, as suggested in the parent application, Serial No. 732,921. Such an embodiment of the invention is shown in Fig. 16 of the drawings and will hereinafter be more particularly referred to; but in this construction with the single holding-guide 4ᵃ utilized it is only necessary that such guide be provided with means for gripping and holding the edge of a card or sheet sufficiently tight to keep it from shifting while the printing is being accomplished. However, in most forms of the invention, as shown in the present application and in the parent application referred to, the work-holder proper usually consists of the holding-guides 4, arranged in one or more pairs in proper relation to the machine and its platen and having means for holding and guiding the edges of a card or sheet.

Although a plurality of pairs of holding-guides may be utilized, as pointed out in the parent application, Serial No. 732,921, still, for illustrative purposes, only a single pair of such guides is shown in most of the figures of the drawings of this case, and, referring to the embodiment of the invention shown in Fig. 1 of the drawings, it is to be observed that the holding-guides 4 are shown as maintaining an operative relation in substantial parallelism, respectively, at opposite sides of the printing area and arranged over the top or writing surface of the platen. In the ordinary use of the work-holder—that is, in printing upon index cards or sheets one at a time—it is not necessary to the successful carrying out of the invention that the holding-guides extend the full length of the platen, and consequently the printing area for an ordinary index-card is comparatively small as compared to the usual size of an ordinary platen. However, the holding-guides are constructed in lengths commensurate with the printing area required upon the platen; but in the drawings the holding-guides are shown of such lengths as adapt the same especially for printing upon index-cards.

As already stated, the holding-guides 4 may be formed in various ways. One construction is shown in the drawings in which each holding-guide is illustrated as essentially consisting of a flat strip or length of metal or other suitable material, provided at one edge with a longitudinal guideway 5, closed at the upper and lower sides thereof to form a complete housing for the edge of the card or sheet slidably engaging therein. In the preferable construction of the guides the longitudinal ways 5 are of a U shape in cross-section, inasmuch as this shape of guideway has been found effective in firmly holding the edges of the card or sheet, while at the same time permitting the latter to be readily slid in and out of position. It is also preferable in the construction of the holding-guides 4, which are substantially straight throughout their entire length, to provide the same at their front or swinging ends with outwardly-flaring and enlarged mouths 6, constituting entrance-guides to facilitate the entrance or insertion of the individual cards or sheets to be printed upon. These details, however, need not be fully carried out in the practical use of the invention, as the work-holding members 4 may be provided with any suitable guiding and holding means for the edges of the card or sheet and may be used with or without entrance-guides at the front ends thereof without departing from the spirit or scope of the invention.

The present invention contemplates the movement of the work-holder to and from the writing-surface of the platen. This may be accomplished in various ways. In the construction shown in Fig. 1 the work-holding members or guides 4 are illustrated as being provided at their rear ends with collars 7, receiving a supporting-shaft 8, arranged transversely of the platen and preferably journaled in bearings 9 at opposite sides thereof. In this form of the invention the transverse supporting-shaft is preferably arranged beneath the plane of the main-track rails 2 and disposed within the transverse groove 10, cut in the face of the platen and extending transversely from side to side thereof, so as to provide for the mounting of the supporting-shaft 8 in a non-interfering position. The said transverse supporting-shaft 8 for the work-holding guides or members 4 rocks in its bearings 9 and is adapted to have the collars 7 of the guides or members 4 longitudinally adjustable thereon and fixed thereto in an adjusted position through the medium of set-screws or equivalent fastenings 11. This construction provides for the individual adjustment of the work-holding guides or members 4, whereby one or both of such guides may be adjusted to accommodate the work-holder to different sizes or shapes of cards or sheets, and therefore to vary the interval or space between the work-holding guides or members, which interval or space properly constitutes the printing area of the platen.

In the construction just described the weight of the work-holding guides or members 4 may be utilized to normally hold them in their depressed positions flat upon the top or writing surface of the platen, which position the work-holding guides or members occupy when the printing mechanism or machine 1 is arranged thereover, so as to print upon the work held by the holder. When the printing mechanism or machine is moved back upon the platen beyond the plane of the work-holder, the present invention contemplates means for the raising thereof away from the writing-surface to facilitate the handling of the work. It will be observed that since the edges of the card or sheet are engaged the work-holder when raised will carry the work away from the writing-surface. In the form of the invention illustrated in Fig. 1 the guideways 5 are not open at both ends, and therefore the raising or elevation of the work-holder is necessary to facilitate both the insertion and removal of the work. This may be accomplished in a simple and practical manner by attaching a finger-plate 12 on one extremity of the supporting rock-shaft 8 beyond one side of the platen, so that the operator after moving the printing mechanism back from the work simply presses upon the plate 12, and thereby rocks the shaft 8 to secure the elevation of the work-holding members 4, which readily gravitate to their depressed position when the pressure is relieved from the plate 12.

Instead of mounting the work-holding members 4 upon the single continuous supporting-shaft 8 the modification illustrated in Figs. 3 to 5, inclusive, may be resorted to. In this modification each holding guide or member 4 is illustrated as being mounted upon a separate shaft-section 13, journaled in suitable bearings 14 and also located within the transverse groove $10^a$, cut in the top face of the platen. In this construction the separate shaft-sections 13 are arranged in transverse alinement, but their inner ends terminate at the connection of the holding guides or members 4 therewith, so as to leave a clear space between the rear ends of the holding guides or members. This arrangement of the separate shaft-sections permits of the longitudinal guideways of the holding guides or members being extended the full length of the latter and open at both ends, so that an index-card with a tab or projection thereon may have the latter lie upon the writing-surface of the platen between and beyond the rear portions of the holding guides or members, thus permitting of the tab or projection of the card being printed upon, as well as the body portion of the card. Furthermore, the construction described permits the printed card to be forced out of the holding guides or members directly upon the portion of the platen in rear thereof, thus expediting the manipulation of the cards.

In the form of the invention shown in Figs. 3 to 5 of the drawings not only are the collars of the holding guides or members illustrated as being individually adjustable on their respective shaft-sections, but each of said shaft-sections is also shown as having mounted thereon a pair of adjusting-collars 15, held by set-screws 16 upon the shaft-sections respectively at opposite sides of the main-track rails, beneath which it extends, so that by loosening the screws 16 and resetting the collars 15 the shaft-sections may be adjusted independently of the work-holding guide or member carried thereby. A wide range of adjustment is thus secured in order to meet every requirement of the work.

In connection with the modification described there is shown substantially the same manual lifting means as illustrated in Fig. 1, although by reason of the employment of separate shaft-sections 13 for the individual holding guides or members 4 it is necessary to employ a separate operating-shaft 17, extending transversely across the entire platen and having fitted thereon at suitable points the lifting-fingers 18, which bear under rock-arms 19, extended laterally from the separate shaft-sections 13. The said operating-shaft 17 is shown as provided at one end with a finger-plate $12^a$. By pressing upon this finger-plate $12^a$ the lifting-fingers 18 simultaneously bear under the rock-arms 19 of the two shaft-sections 13, thereby securing a uniform and synchronous elevation of the work-holding guides or members. The lowering of the work-holding guides or members to operative positions upon the writing-surface is accomplished in the construction described simply by gravity.

Instead of manually raising the work-holding guides or members this may be accomplished automatically by the movement of the machine or printing mechanism 1, as shown in Figs. 6 and 7 of the drawings. In this modification of the invention the work-holding guides or members 4 are mounted upon the single transverse supporting rock-shaft 8 in the same manner as disclosed in Fig. 1 of the drawings; but instead of the finger-plate 12 at one end of the rock-shaft the latter has fitted thereto a cam-lever 20, extending rearwardly and provided at its swinging end with an upturned engaging portion 21, which is adapted to be engaged by the frame of the machine or printing mechanism 1 when the same is moved backward upon the platen in rear of the plane of the work-holder, as shown in Fig. 7 of the drawings. Upon the movement of the machine or printing mechanism in such direction the raising of the work-holding guides or members is necessarily accomplished automatically, and upon the forward movement of the machine to again carry the same over the work-holder and the card or sheet held thereby the said work-holder, consisting of the work-holding members or guides, falls to an operative position upon the writing-surface of the platen. The weight of the work-holding guides or members may be utilized to accomplish this lowering movement in the construction described, although the same may be assisted by the use of a suitable return-spring 22, coiled upon the shaft 8. This spring obviously may be used or omitted at will.

Another variation of the invention is to provide for the normally automatic raising of the work-holding guides or members and the depression thereof by the machine or printing mechanism. Such a modification is shown in Figs. 8 and 9 of the drawings and may be carried out by fitting on one extremity of the supporting rock-shaft 8 a forwardly-extending presser-lever 23, with which may be conveniently associated an elevating-spring 24, bearing at one end beneath the lever 23 and supported at its other end on a bracket 25 upon the platen. This spring, however, may be arranged in any other suitable way, so long as it provides for normally elevating or raising the work-holding guides or members to facilitate the insertion and removal of the work. The said presser-lever 23 is of an angled or other suitable formation, according to the shape and position of the frame of the machine or printing mechanism 1, so that when the said machine or printing mechanism is advanced forwardly upon the platen the frame thereof engages with the presser-lever 23 and depresses the same, with a consequent depression of the holding guides or members, upon the writing-surface of the platen. Upon the movement of the machine or printing mechanism back from the work-holder onto the rear portion of the platen the spring 24 automatically raises or elevates the work-holding guides or members.

A still further variation is embodied in the idea of utilizing the movement of the machine or printing mechanism to both positively raise and lower the work-holding guides or members. This modification is illustrated in Figs. 10 and 11 of the drawings and simply consists in fitting upon one or both extremities of the supporting rock-shaft 8 forwardly and rearwardly extending lever-arms 26 and 27, respectively, which are engaged by the machine-frame respectively upon the forward and backward movement thereof. Upon the forward movement of the machine or printing mechanism over the work-holder the same engages with the lever-arm 26 and carries the work-holding guides or members to their depressed positions over the writing-surface of the platen, while a corresponding backward movement of the machine causes the engagement of its frame with the rearwardly-extending lever-arm 27, thus securing an automatic elevation of the work-holding guides or members.

In its original conception the invention did not contemplate the cutting out of the platen to form a groove receiving the supporting rock-shaft for the work-holding member or members, and one of the original forms of the invention also involved the employment of a different arrangement of parts from that shown in Figs. 6 and 7 of the drawings to provide for the automatic elevation of the work-holder by the movement of the printing mechanism. These original conceptions or embodiments of the invention are shown in the construction illustrated in Figs. 12 and 13 of the drawings. This construction, like most of the other forms of the invention already described, involves the employment of the supporting rock-shaft 8, which instead of being seated in the cut-out portion or groove of the platen is arranged transversely across the top of the platen, with the end portions thereof lying in suitable notches or openings 30 at the under side of the main-track rails 2 upon the platen. In this form of the invention, therefore, the ordinary type of book-platen may be utilized, as no change in the construction thereof is required; but in addition to carrying the work-holding guides or members 4 the supporting rock-shaft 8 in the construction illustrated in Figs. 12 and 13 is provided with tappet-pins 31, projecting outwardly through slots 32ª, formed longitudinally in the front portions of the main-track rails 2, and said tappet-pins 31 are adapted to be engaged by contact projections or studs 32, carried by the frame of the traveling printing mechanism 1, so that when said printing mechanism is moved back upon the platen away from the printing area between the work-holding members or guides 4 the same will provide, in conjunction with the pins 31, means for automatically raising or elevating the work-holder from the writing-surface of the platen to facilitate the handling of the work in the manner already described. The construction referred to only necessitates the slotting of the front portions of the main-track rails 2, upon which the printing mechanism has a play when arranged over the work. In order to make provision for permitting the printing mechanism to be moved freely to any position beyond the tappet pins or projections 31 of the supporting rock-shaft 8, the pinions 33 of the line-spacing mechanism of the machine may be provided with peripheral grooves 34, which receive the upstanding ends of the pins 31, and thereby permit the pinions 33 to have a free clearance of travel thereover should the machine or printing mechanism be moved past its operative relation to the pins 31, as shown in Fig. 13 of the drawings.

In its original conception the invention contemplated the mounting of the work-holder and its supporting rock-shaft upon the platen as an attachment, so as to be removable from the platen to permit of the use of the latter for its ordinary purposes as a book-platen or for any other work. This embodiment of the invention in its simplest form is shown in Figs. 14 and 15 of the drawings and simply consists in having the supporting rock-shaft 8 arranged transversely across the top of the platen and working in notches 30ª, formed in the under side of the main-track rails. With the track-rails in position the work-holder attachment, consisting of the shaft 8 and the work-holding members or guides 4, will be held in proper operative position; but upon the removal of the track-rails 2 the entire work-holding device may be readily detached from the platen for the purposes stated. Any means for turning the shaft 8 to provide for raising and lowering the work-holding members or guides 4 may be resorted to in the construction shown in Figs. 14 and 15 of the drawings; but there is illustrated in connection therewith the finger-plate 12, which constitutes one means for manually elevating the work-holder.

A final variation of the invention in one of its simplest aspects is illustrated in Fig. 16 of the drawings. This modification of the invention illustrates one of the features already pointed out—namely, that the workholder may consist of a single member or holding-guide 4ª, which may have the edges of the guideway thereof arranged in such relation as to exert a spring grip upon the edges of the card or sheet or which may be provided with an auxiliary holding-spring 4ᵇ, arranged to exert a pressure upon the card or sheet to insure the holding thereof sufficiently tight to prevent the same from shifting while the printing is being accomplished. This construction is illustrated in Fig. 16 of the drawings, and the single guide is shown associated with a single supporting rock-shaft 8, which is arranged transversely across the top of the platen and held beneath the main-track rails in the manner shown in Fig. 14 of the drawings.

It will be observed that in all the forms of my invention as herein shown and described the work-holder is movable in the arc of a circle, and while this is the preferable arrangement I consider it to be only one of the ways that the desired result can be accomplished so as to be brought within the scope of my invention.

It has already been explained that in the carrying out of the invention not only cards but also other work may be held and guided by the members of the work-holder, and the guideways thereof may be sufficiently large to accommodate separate sheets with carbon interposed for manifold or billing work should such work be required.

In the broad aspect of the work-holder being movable in a direction to and from the writing-surface, in connection with the means for effecting an elevation and depression thereof either manually or automatically, the present application is generic to the companion application of Stackpole and Laganke, Serial No. 52,213, filed March 21, 1901.

From the foregoing it is thought that the essential features of the invention and the operative relations thereof will be readily understood without further description, and while a few modifications have been illustrated it will of course be understood that various changes in the form, proportion, and minor details of construction may be resorted to without departing from the principle or sacrificing any of the advantages of this invention.

Having thus described the invention, what is claimed as new, and desired to be secured by Letters Patent, is—

1. In a type-writing machine, the combination with the flat platen, and the traveling machine, of a work-holder having guiding and holding means for the work and movable to and away from the writing-surface of the platen.

2. In a type-writing machine, the combination with the flat platen, and the traveling machine, of a work-holder having guiding and holding means for the work, and interposed in a plane between the machine and the writing-surface of the platen, said work-holder being movable away from the writing-surface.

3. In a type-writing machine, the combination with the flat platen, the traveling machine, and the main tracks or guides for the machine, of a work-holder interposed in a plane between the main tracks or guides and provided with guiding and holding means for the work, said work-holder being movable away from the writing-surface of the platen.

4. In a type-writing machine, the combination with the flat platen, and the traveling machine supported thereon, of a work-holder movable away from the writing-surface and comprising oppositely-disposed guideways, said work-holder being interposed in a plane between the machine and the writing-surface of the platen.

5. In a type-writing machine, the combination with a flat platen, and the tracks or guides for the traveling machine, of a work-holder arranged for movement away from the platen and having guides open at their rear ends.

6. In a type-writing machine, the combination with a flat platen over which the machine is mounted to travel, of a work holder and carrier mounted on the platen to retain the work thereon and movable to carry the work away from the platen.

7. In a type-writing machine, the combination with a flat platen over which the machine is mounted to travel, of a work holder and carrier mounted to retain the work upon the platen and movable to carry the work away from the platen.

8. In a type-writing machine, the combination with a flat platen over which the machine is mounted to travel, of a swinging work holder and carrier mounted to retain the work upon the platen and movable to carry the work away from the platen.

9. In a type-writing machine, the combination with a flat platen over which the machine is mounted to travel, of a work holder and carrier mounted to retain the work upon the platen and movable to carry the work away from the platen, said work holder and carrier being operated by the machine.

10. In a type-writing machine, the combination with a flat platen over which the machine is mounted to travel, of a work holder and carrier located in a plane to permit the machine to travel thereover, and mounted to retain the work upon the platen and movable to carry the work away from the platen.

11. In a type-writing machine, the combination with the flat platen, and the main tracks or guides for the traveling machine, of work-holding members arranged in a plane between said tracks or guides and disposed in opposite relation, said work-holding members being movable away from the writing-surface and provided with guiding and holding means for the work.

12. In a type-writing machine, the combination with the flat platen, and the traveling machine, of adjustable work-holding guideways movable away from the writing-surface and supported thereover below the plane of the machine.

13. In a type-writing machine, the combination with the flat platen, and the traveling machine, of work-holding guideways movable away from the writing-surface and transversely adjustable with relation to the platen, said work-holding guideways being adapted to occupy an operative position in a plane between the machine and the writing-surface of the platen.

14. In a type-writing machine, the combination with the flat platen, and the traveling machine supported thereon, of work-holding guides movable away from the writing-surface of the platen, and having an individual lateral adjustment.

15. In a type-writing machine, the combination with the flat platen, and the traveling machine arranged thereover, of a work-holder consisting of an open frame having members provided with guiding and holding means for the work, and adapted to occupy a position between the machine and the writing-surface of the platen, said work-holder being movable away from the writing-surface.

16. In a type-writing machine, the combination with the flat platen, and the traveling machine arranged thereover, of a work-holder comprising a pair of oppositely-arranged members having guiding and holding means for the work, and movable away from the writing-surface of the platen.

17. In a type-writing machine, the combination with the flat platen, and the traveling machine supported thereon, of work-holding guideways movable away from the writing-surface and located respectively at opposite sides of the printing area of the platen below the plane of the machine, said guideways having front entrance-guides.

18. In a type-writing machine, the combination with a flat platen, the tracks or guides, and the traveling machine, of a swinging work-holder comprising coacting parallel members disposed upon the platen between the tracks or guides and in a plane between the platen and the traveling machine.

19. In a type-writing machine, the combination with a flat platen, the tracks or guides, and the traveling machine, of a swinging work-holder disposed upon the platen between the tracks or guides and in a plane between the platen and the traveling machine, so as to permit the machine to travel thereover, said work-holder being operated upon by the machine.

20. In a type-writing machine, the combination with a flat platen, and a machine disposed to travel thereover, of a swinging work-holder and carrier arranged to hold the work in contact with the platen during the printing operation and movable to carry the work away from the writing-surface.

21. In a type-writing machine, the combination with the flat platen, and the traveling machine, of a vertically-swinging work-holder arranged over the platen and having guiding and holding means for the work.

22. In a type-writing machine, the combination with the flat platen, and the traveling machine arranged thereover, of a vertically-swinging work-holder adapted to occupy a position beneath the machine and having guiding and holding means for the work, and means for causing said work-holder to swing from the writing-surface of the platen.

23. In a type-writing machine, the combination with the flat platen, of a swinging work-holder arranged over the platen and having spaced holding and guiding means for the opposite edges of the work, said work-holder moving in the arc of a circle.

24. In a type-writing machine, the combination with the platen, and the machine rails or guides, of a work-holder arranged between the said rails or guides and having guiding and holding means for the work, and means for hingedly connecting the work-holder with the platen so as to cause the former to either lie flat upon the platen or assume a raised position above the same.

25. In a type-writing machine, the combination with the platen, and the tracks or guides, of a machine mounted on the tracks or guides to travel over the platen, a work-holder located between the tracks or guides and in a plane intermediate of the platen and machine to permit the latter to travel freely thereover, and means for automatically moving the work-holder away from the platen.

26. In a type-writing machine, the combination with the flat platen, and the traveling machine arranged thereover, of a work-holder having guiding and holding means for the work and adapted to occupy a position between the machine and the writing-surface of the platen, and means for automatically moving the work-holder from the writing-surface.

27. In a type-writing machine, the combination with the flat platen, and the traveling machine arranged thereover, of a work-holder having guiding and holding means for the work and adapted to occupy a position beneath the machine, and means for automatically elevating the work-holder away from the writing-surface of the platen.

28. In a type-writing machine, the combination with the flat platen, and the traveling machine, of a work-holder having guiding and holding means for the work and adapted to occupy a position beneath the machine, and means for automatically moving the work-holder to and from the writing-surface.

29. In a type-writing machine, the combination with a stationary flat platen, and tracks or guides for a traveling machine, of a work-holder movable toward and from the writing-surface of the platen, and reactive means urging said work-holder away from the platen.

30. In a type-writing machine, the combination with a stationary platen, and the tracks or guides for the traveling machine, of a movable work-holder, means for urging the work-holder away from the platen, and means for retaining the work-holder in opposition to said first-named means.

31. In a type-writing machine, the combination with the platen, and the tracks or guides, of a machine mounted on the tracks or guides to travel over the platen, a work-holder located between the tracks or guides and in a plane intermediate of the platen and machine to permit the latter to travel freely thereover, and movable toward and away from the platen, and machine-operated means for automatically moving the work-holder.

32. In a type-writing machine, the combination with the flat platen, and the traveling machine arranged thereover, of a work-holder having guiding and holding means for the work and adapted to occupy a position beneath the machine, and means, controlled by the movement of the latter, for causing the work-holder to move to and from the writing-surface of the platen.

33. In a type-writing machine, the flat platen, the traveling machine, a work-holder arranged beneath the machine and adapted to be moved to its depressed position by the latter, and means for elevating the work-holder from the writing-surface.

34. In a type-writing machine, the traveling machine, the stationary flat platen, a work-holder arranged beneath the machine and adapted to be held in its depressed position by the same, and means for automatically elevating the work-holder when the machine is moved backward therefrom.

35. In a type-writing machine, the combination with the flat platen, and the traveling machine arranged thereover, of a work-holder adapted to occupy a position beneath the machine, and means for causing an automatic raising and lowering of the work-holder by the movement of the machine.

36. In a type-writing machine, the combination with the flat platen, the machine guides or tracks and the traveling machine, of a work-holder arranged over the platen beneath the machine, and adapted to be moved to its depressed position to bring the work in contact with the platen by the movement of the machine.

37. In a type-writing machine, the combination with the flat platen, the traveling machine arranged thereover, and the machine guides or tracks, of a work-holder adapted to occupy a position beneath the machine and over the platen, and to be moved to its depressed position by the machine, and yielding means for elevating the work-holder after the machine has been moved back beyond the printing-point.

38. In a type-writing machine, the combination with the platen, of a vertically-swinging work-holder comprising a rock-shaft member or members, and spaced holding means associated therewith and arranged over the platen to engage different edges of a work element.

39. In a type-writing machine, the combination with the flat platen, of a work-holder comprising a rock-shaft, vertically-swinging guides carried by said rock-shaft, and means associated with the shaft for elevating the work-holding guides from the writing-surface.

40. In a type-writing machine, the combination with the platen, of a work-holder comprising a transversely-arranged rock-shaft, guides individually adjustable upon said shaft, and means associated with the shaft for causing an elevation of the work-holding guides.

41. In a type-writing machine, the combination with the platen, and the main tracks or guides for the traveling machine, of a work-holder comprising a supporting rock-shaft, and means carried by said shaft for guiding the work.

42. In a type-writing machine, the combination with the platen, and the main tracks or guides for the traveling machine, of a vertically-swinging work-holder comprising a transversely-arranged rock-shaft, and means carried by said shaft for guiding the work.

43. In a type-writing machine, the combination with the flat platen, and the machine rails or guides, of a swinging work-holder consisting of a transversely-disposed rock-shaft carrying holding and guiding means for the work, said holding and guiding means being arranged between the machine rails or guides, and means for rocking the shaft to move the holding and guiding means toward and away from the platen.

44. In a type-writing machine, the combination with the flat platen, and the machine rails or guides, of a work-holder consisting of a transversely-disposed rock-shaft carrying holding and guiding means for the work, said holding and guiding means being arranged between the machine rails or guides and adapted to be swung, by the turning of the rock-shaft, so as to rest upon the platen or be elevated out of contact therewith.

45. In a type-writing machine, the combination with a flat platen, tracks or guides, and a traveling machine, of a swinging work-holder having guiding means for the work and disposed between the tracks or guides.

46. In a type-writing machine, the combination with a flat platen, tracks or guides, and a machine mounted to travel over the platen, of a work-holder secured to the platen and disposed for actuation by a part of the machine.

47. In a type-writing machine, the combination with a flat platen, tracks or guides and a traveling machine, of a work-holder secured to the platen between the tracks or guides and in a plane between the platen and the machine, said work-holder being operated by the machine.

48. In a type-writing machine, the combination with a platen, and the main tracks or guides for a traveling machine, of a machine-operated work-holder comprising a rock-shaft, and means carried by said shaft for holding the work.

49. In a type-writing machine, the combination with the platen, and the main tracks or guides for a traveling machine, of a vertically-swinging, machine-operated work-holder, comprising a transversely-arranged rock-shaft, and means carried by said shaft for holding the work.

50. In a type-writing machine, the combination with a flat platen, and main tracks or guides for a traveling machine, of a swinging, machine-operated work-holder, consisting of the transversely-disposed rock-shaft carrying holding means for the work, said holding means being arranged between the tracks or guides and in a plane between the platen and the machine.

51. In a type-writing machine, the combination with a flat platen, and the main tracks or guides, of a machine-operated work-holder consisting of a transversely-disposed rock-shaft carrying holding means for the work, said holding means being arranged between the main tracks or guides and adapted to be swung by the turning of the rock-shaft, so as to rest upon the platen or to be elevated out of contact therewith.

52. In a type-writing machine, the combination with a flat platen, tracks or guides and a traveling machine, of a work-holder movable toward and away from the platen and disposed for actuation by a part of the machine.

53. In a type-writing machine, the combination with a flat platen, tracks or guides and a traveling machine, of a work-holder movable away from the platen by a machine part disposed to contact therewith.

54. In a type-writing machine, the combination with a platen, main tracks or guides and a traveling machine, of a swinging machine-operated work-holder.

In testimony that I claim the foregoing as my own I have hereto affixed my signature in the presence of two witnesses.

HIRAM JOSEPH HALLE.

Witnesses:
 H. LUBERHEIM,
 CONRAD PREISEL.